Patented May 1, 1923.

1,453,781

UNITED STATES PATENT OFFICE.

CHARLES S. ASH, OF SAN FRANCISCO, CALIFORNIA, ASSIGNOR TO CALIFORNIA PACKING CORPORATION, OF SAN FRANCISCO, CALIFORNIA, A CORPORATION OF NEW YORK.

PROCESS OF PEELING FRUITS AND VEGETABLES.

No Drawing.   Application filed September 19, 1922.   Serial No. 589,241.

*To all whom it may concern:*

Be it known that I, CHARLES S. ASH, a citizen of the United States, residing at the city and county of San Francisco and State of California, have invented new and useful Improvements in Processes of Peeling Fruits and Vegetables, of which the following is a specification.

This invention relates to a process for peeling fruits and vegetables.

At the present time peaches, apricots and other fruits are peeled by the use of lye somewhat in the following manner: A lye bath of proper strength is prepared into which the product, pitted and halved, or whole, is immersed. After being immersed it is washed free from the lye with water and is then ready to be canned.

This process has reached its maximum effectiveness with peaches where it works quite satisfactorily, but with apricots containing less fiber than peaches and being much more porous, the latter absorb the lye rapidly and the lye diffuses throughout the fruit neutralizing much of the natural acid. In consequence of this the product has an insipid taste. With pears lye is useless as a peeling agent, as it does not attack the smooth, tough skin of the pear.

The present invention has for its object to peel fruits and vegetables which cannot be peeled successfully or commercially by the lye process. This I accomplish by exposing the products to a corrosive acid, such as sulphuric, nitric, phosphoric and chromic, or mixtures thereof.

One manner of practicing the process is substantially as follows:

The fruit or vegetables to be peeled are immersed in a bath of corrosive acid at the desired temperature and for a period of time which varies according to the ripeness and character of the product and also according to the temperature of the acid. These temperatures and time intervals will also vary in accordance with the strength and nature of the acid, but they can readily be determined by a few preliminary tests. For example, I have used a bath of sulphuric acid of 63° Baumé strength at a temperature of 80° C. for the treatment of pears, and found that good results were obtained by keeping the pears immersed in this bath for a period of about 75 seconds. Peaches require a somewhat shorter period of time than is required for the treatment of pears.

The acid causes the skins of the fruit or vegetables to soften and corrode so that they are easily removable by a water bath or spray. After treatment with acid the products may be dumped directly into a water bath so as to remove most of the acid and then sprayed to complete the removal of the skins, or this order of procedure may be reversed.

The details of the process are subject to considerable variation and change. For example, the skins may be corroded more or less by a treatment of acid and thereafter steam or a spray or bath of hot water may be used to complete the removal of the skins. Also the fruit or vegetables may be put through a neutralizing bath containing in solution an agent such as sodium, potassium or ammonium compounds, such as bicarbonate of soda. This neutralizing bath may be used at any point in the washing period, preferably after the first acid has been removed. After the products have passed through the neutralizing bath they are then washed free of the neutralizing agent or any salts that are formed during this process.

Instead of immersing the products in an acid bath they may be subjected to acid fumes, as, for example, sulphur tri-oxide. However, I prefer to use a bath of sulphuric acid on account of its cheapness and the simplicity of its application.

Having thus described my invention, what I claim and desire to secure by Letters Patent is:

1. A process of peeling fruits and vegetable products which consists in subjecting the products to the action of a corrosive acid for a sufficient length of time to cause the skins to corrode, washing the products so as to remove the acid and removing the corroded skins.

2. A process of peeling fruits and vegetable products which consists in immersing the products in a bath of corrosive acid for a sufficient length of time to cause the skins to corrode, removing the products from the bath and washing them free of the acid and removing the corroded skins.

3. A process of peeling fruits and vegetable products which consists in immersing the products in a bath of sulphuric acid for a sufficient length of time to cause the skins to corrode, removing said products from the acid bath, washing them free of the acid and removing the corroded skins.

4. A process of peeling fruits and vegetable products consisting of exposing the products to the action of a corrosive acid and neutralizing the acid by the use of an alkaline solution substantially as described.

CHARLES S. ASH.